(12) United States Patent
Andoh et al.

(10) Patent No.: US 7,241,976 B2
(45) Date of Patent: Jul. 10, 2007

(54) STEAM COOKER

(75) Inventors: Yuhji Andoh, Yamatokoriyama (JP); Toshiyuki Irie, Kashiba (JP); Shinya Ueda, Yamatotakada (JP); Masami Umemoto, Amagasaki (JP); Tadanobu Kimura, Mie (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/564,095

(22) PCT Filed: Jul. 23, 2004

(86) PCT No.: PCT/JP2004/010462

§ 371 (c)(1),
(2), (4) Date: Jan. 11, 2006

(87) PCT Pub. No.: WO2005/012796

PCT Pub. Date: Feb. 10, 2005

(65) Prior Publication Data

US 2006/0169686 A1    Aug. 3, 2006

(30) Foreign Application Priority Data

Jul. 31, 2003    (JP) .............................. 2003-204197

(51) Int. Cl.
*A21B 1/24* (2006.01)
*A21B 3/04* (2006.01)
(52) U.S. Cl. .................. 219/401; 219/400; 126/20; 126/21 A
(58) Field of Classification Search .............. None
See application file for complete search history.

(56) References Cited

U.S. PATENT DOCUMENTS

| 5,016,605 A | | 5/1991 | LaForet et al. |
| 5,215,000 A | * | 6/1993 | Desage et al. ................ 99/331 |
| 5,525,782 A | * | 6/1996 | Yoneno et al. .............. 219/401 |
| 5,802,963 A | * | 9/1998 | Cohn et al. .................... 99/476 |
| 6,008,482 A | | 12/1999 | Takahashi et al. |

FOREIGN PATENT DOCUMENTS

| JP | 54-127769 A | * | 10/1979 |
| JP | 62-31207 U | | 2/1987 |
| JP | 3-55433 A | | 3/1991 |
| JP | 7-293889 A | | 11/1995 |
| JP | 9-4849 A | | 1/1997 |
| JP | 2002-153380 A | | 5/2002 |
| JP | 2003-21337 A | | 1/2003 |

* cited by examiner

*Primary Examiner*—Joseph Pelham
(74) *Attorney, Agent, or Firm*—Birch, Stewart, Kolasch & Birch, LLP

(57) ABSTRACT

A sub-cavity with an integral steam heater is provided in a ceiling portion of a heating chamber. A gas in the heating chamber is sucked into a blower through a gas suction opening and sent into an external circulation path. The gas passing through the external circulation path sucks steam from a steam producing device by using steam suction ejector. The gas that took the steam in enters into the sub-cavity, as the gas return opening, from the external circulation path. The steam contained in the gas is heated by the steam heater in the sub-cavity to become an overheated state, spouted out downward from spouting holes in the bottom face of the sub-cavity, and collides with an object to be heated. The external circulation path is constructed from a pipe with a circular cross-section.

9 Claims, 6 Drawing Sheets

STEAM COOKER

BACKGROUND OF THE INVENTION

1. Field of the Invention

The present invention relates to a steam cooker.

2. Description of the Related Art

Conventionally, there have been proposed various steam cookers for performing cooking by using steam. Examples of the steam cookers can be seen in Patent Publication 1 and Patent Publication 2. For example, Patent Publication 1 discloses a steam cooking apparatus that blows steam into a food tray. Patent Publication 2 discloses a heat cooking apparatus that supplies superheated steam into a cooking chamber or makes steam in the cooking chamber overheated by radiation heating.

Patent Publication 1: JP-U 03-67902 (1991) (p. 6 to 11, FIGS. 1 to 3)

Patent Publication 2: JP-A 08-49854 (1996) (p. 3 to 4, FIGS. 1 to 7)

The steam cooking apparatus disclosed in Patent Publication 1 is an apparatus for professional use in which steam is supplied to a plurality of food trays from a steam supply pipe. The configuration is not preferable from the aesthetic viewpoint since the steam supply pipe is provided uncovered in the cooking chamber, and is not suitable for a cooker for home use. The applicable range of steam jet is limited due to the shape of the steam supply pipe and it is difficult to uniformly jet steam to foods (i.e., object to be heated) in the cooking chamber. Since steam, which has heated food, is exhausted via a steam exhaust port straightaway or condensed to be drained through a drain pipe, in order to continue cooking, a large quantity of steam has to be continuously supplied from the outside, and a boiler of high steam generating capability is required. Necessitating such large amount of energy, this kind of steam cooking apparatus is not suitable for home use.

In the heat cooking apparatus disclosed in Patent Publication 2, steam is not blown toward foods whereas it is generated in the apparatus itself. Since an external boiler is not used, the apparatus can be used in a home. Steam is circulated and used in the cooking chamber, so that energy efficiency is high. However, foods are cooked with steam in a manner such that the object to be heated is cooked by being surrounded by steam which is introduced into the cooking chamber or generated in the cooking chamber. The ability of the cooking apparatus is insufficient in terms of promptly transmitting large quantity of heat to foods to cook them quickly.

The present invention has been made in consideration of the above points, and provides a steam cooker of high heating efficiency. The present invention also reduces the quantity of dissipated heat without being used for cooking.

SUMMARY OF THE INVENTION

A steam cooker according to the present invention comprises: a cooking chamber in which foods are put; an external circulation path for blowing gas sucked from the cooking chamber via a suction port into the cooking chamber via a blowhole so that the gas strikes the foods in the cooking chamber; a blower for generating gas current traveling from the suction port to the blowhole in the external circulation path; and a steam generator for supplying steam to the gas passing through the external circulation path. Herein, the external circulation path is provided with a steam ejector in a position downstream of the blower for sucking steam generated by the steam generator.

With this configuration, the gas in the cooking chamber circulates via the external circulation path and steam is supplied in the external circulation path in the circulation process. Consequently, different from the case of continuously blowing steam in one-way, without requiring the steam generator of high performance, the steam cooker having excellent energy efficiency and suitable for home use can be achieved. Since forced circulation gas current which is sucked from the cooking chamber into the suction port and then blown into the cooking chamber via the blowhole is generated, heating of the object to be heated is accelerated. Further, since the external circulation path sucks steam generated by the steam generator by an ejector provided in a position downstream of the blower, the steam can be promptly sucked without applying pressure on the steam generator, and the steam can mingle with gas current efficiently.

In the above steam cooker according to the present invention, the external circulation path is provided with a bypass for the gas to bypass the steam ejector.

With this configuration, pressure loss of the circulation system is reduced, so that the fan can be driven efficiently and the jet force of steam also is strengthened.

In the above steam cooker according to the present invention, the external circulation path is constructed with pipes with circular cross section.

Being constructed with pipes of circular cross-section, the surface area of the external circulation path is smaller than a duct having a rectangular cross-section. Consequently, heat dissipation from the external circulation path is reduced, and the energy efficiency improves.

In the above steam cooker according to the present invention, the blower includes a centrifugal fan.

With this configuration, as compared with the case of using a propeller fan, the flow velocity of gas current blown from the blower can be made higher. Thus, the diameter of the pipe constructing the external circulation path can be decreased. By decreasing the diameter of the pipe, the surface area of the external circulation path is narrowed so that the heat dissipation can be reduced and energy efficiency can be further improved. Since the centrifugal fan can generate higher pressure as compared with a propeller fan, the force of jet from the blowhole can be increased. As a result, the steam jet is elongated, and the foods can be heated intensely.

In the above steam cooker according to the present invention, a motor for driving the centrifugal fan is a direct current motor.

With this configuration, the centrifugal fan can be rotated at high speed and gas current of extremely high flow velocity can be obtained.

The steam cooker according to the present invention comprises: a cooking chamber in which foods are put; an external circulation path for blowing gas sucked from the cooking chamber via a suction port into the cooking chamber via a blowhole so that the gas strikes the foods in the cooking chamber; a blower for generating gas current traveling from the suction port to the blowhole in the external circulation path; and a steam generator for supplying steam to the gas passing through the external circulation path, wherein the external circulation path is provided with a steam ejector in a position downstream of the blower for sucking steam generated by the steam generator, and the gas in the cooking chamber circulates via the external circulation path and steam is supplied in the external circulation path in the circulation process. Therefore, different from the case of continuously blowing steam in one-way, without requiring the steam generator of high performance, the steam cooker having excellent energy efficiency and suitable for home use can be achieved. Since forced circulation gas current which is sucked by a suction port from the cooking chamber and then blown into the cooking chamber via the blowhole is generated, heating of the object to be heated is accelerated. Further, since the external circulation path sucks steam generated by the steam generator by an ejector provided in a position downstream of the blower, the steam can be promptly sucked without applying pressure on the steam generator, and the steam can mingle with gas current efficiently.

DETAILED DESCRIPTION OF THE INVENTION

An embodiment of the present invention will be described below with reference to the drawings.

Figure 1:
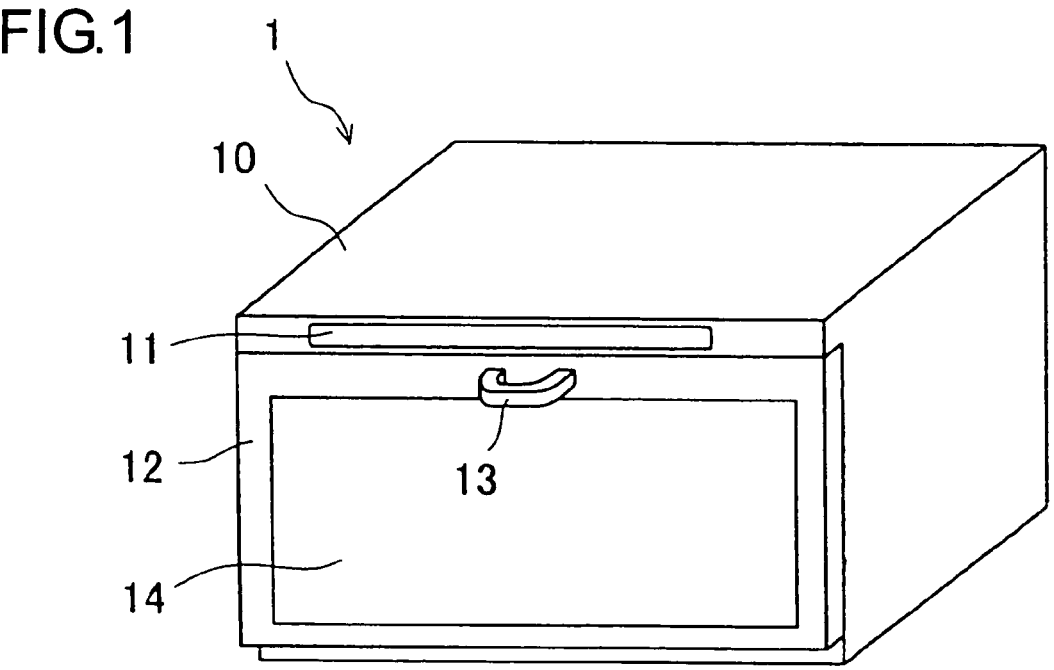
FIG. 1 is a perspective view of a steam cooker according to an embodiment of the present invention.

A steam cooker 1 comprises a cabinet 10 of a rectangular parallelepiped shape. In a front face of the cabinet 10, an operation panel 11 is provided on an upper part and a door 12 is provided below the operation panel 11. The door 12 swings around its lower end as a center in a vertical plane. A user grips a handle 13 provided on an upper part of the door 12 and pulls to the front, thereby enabling a posture of the door 12 to be changed by 90° from a perpendicular closed state shown in FIG. 1 to a horizontal open state shown in FIG. 2. Most part of the door 12 is a window 14 in which a pane of heat-resistive glass is fit.

Figure 2:
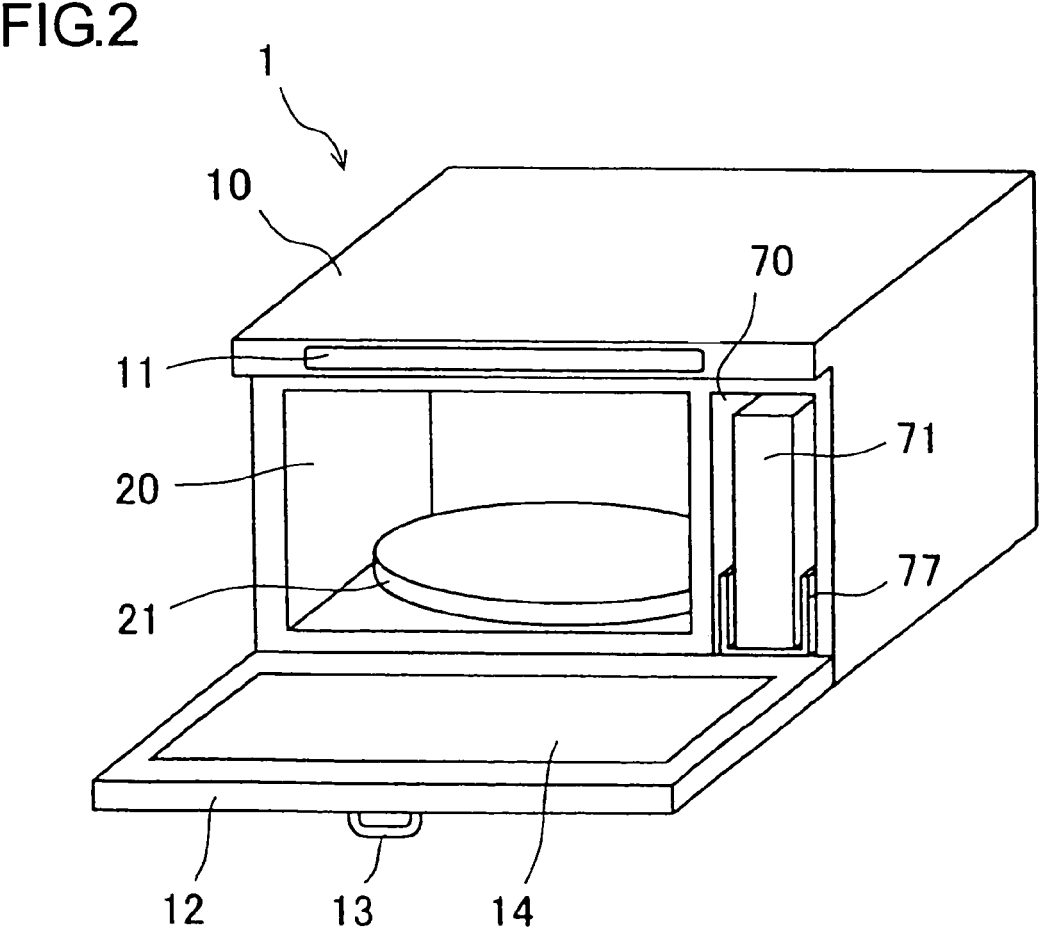
FIG. 2 is a perspective view of the steam cooker in a state where a door of a cooking chamber is open.
Figure 3:
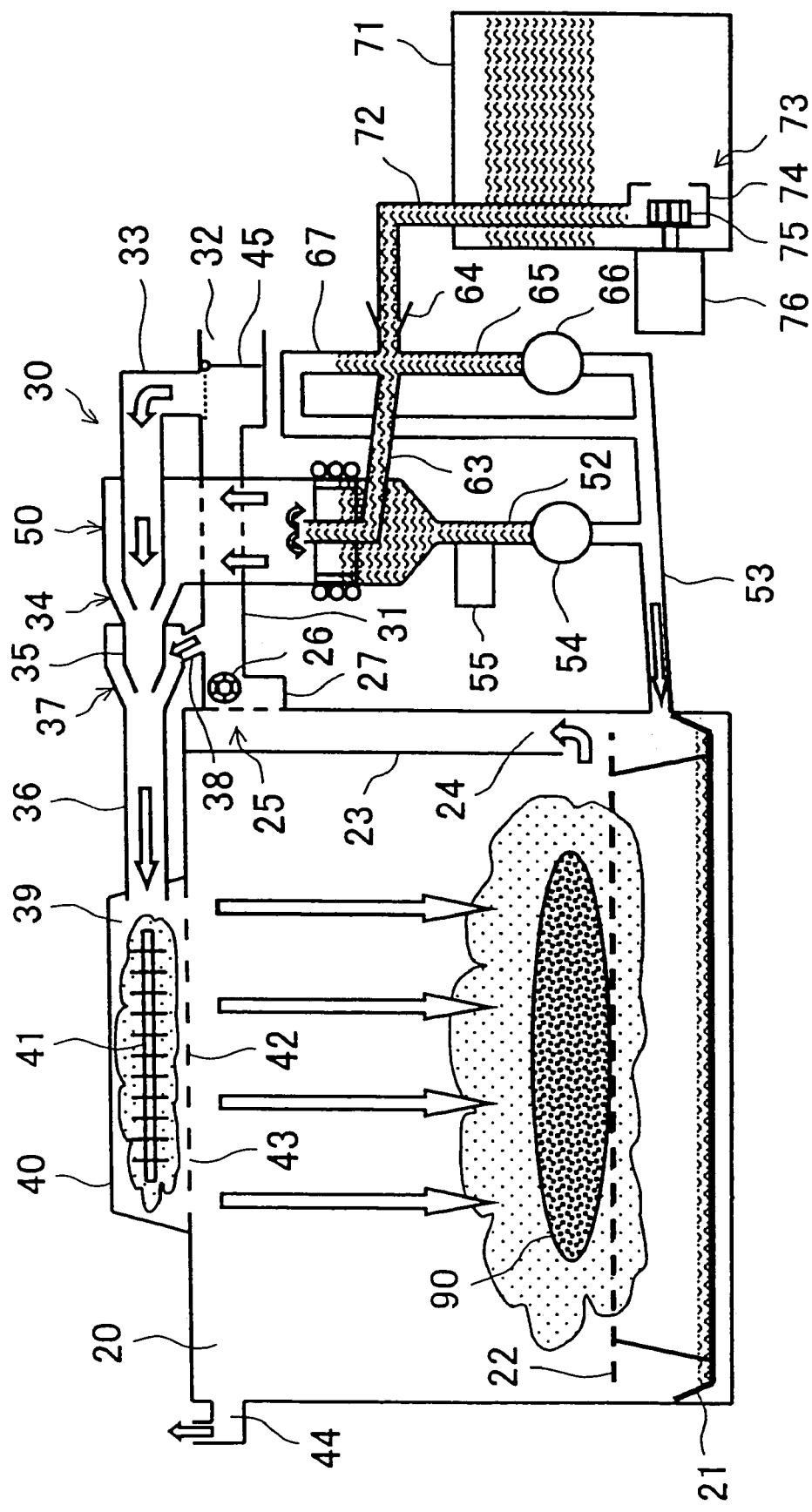
FIG. 3 is a basic structural diagram of an internal mechanism.

When the door 12 is opened, two compartments appear as shown in FIG. 2. A large compartment on the left side is a cooking chamber 20, and a small compartment on the right side is a water tank chamber 70. The structures and accompanying components of the cooking chamber 20 and the water tank chamber 70 will be described below with reference to FIG. 3 and subsequent drawings.

The cooking chamber 20 has a rectangular parallelepiped shape and its whole front side facing the door 12 is an opening. The other faces of the cooking chamber 20 and the inner face of the door 12 are formed with stainless steel plates. The periphery of the cooking chamber 20 and the inside of the door 12 are thermal-insulated. A pan 21 made of a stainless steel plate is disposed on the floor face of the cooking chamber 20, and a rack 22 made of a stainless steel wire, on which foods 90 are placed, is disposed on the pan 21.

Gas in the cooking chamber 20 (Usually, the gas in the cooking chamber 20 is air. When steam cooking starts, the air is replaced by steam. In the specification, therefore, it is expressed as "gas" not "air".) is circulated via an external circulation path 30. Beside a side wall of the cooking chamber 20, an gas current control plate 23 (also made of a stainless steel plate) extending downward from the ceiling to a position near the floor face is disposed in parallel with the side wall. A gap between the lower end of the gas current control plate 23 and the side wall at the back serves as a suction port 24 facing downward, which leads gas into the external circulation path 30.

Gas sucked from the suction port 24 travels behind the gas current control plate 23 toward a blower 25 provided in an upper part on the outside of the cooking chamber 20. The blower 25 includes a centrifugal fan 26, a fan casing 27 for housing the centrifugal fan 26, and a motor (not shown) for rotating the centrifugal fan 26. A sirocco fan is used as the centrifugal fan 26. As the motor for rotating the centrifugal fan 26, a direct current motor, which is capable of rotating at high speed, is used.

The external circulation path 30 connected to the discharge port of the fan casing 27 is constructed by combining pipes each having a circular shape in its cross section. A first pipe 31 projects in the horizontal direction from the fan casing 27. An exhaust port 32 is provided at the end of the first pipe 31. An elbow-shaped second pipe 33 is connected a little downstream of the exhaust port 32 of the first pipe 31. A horizontal part of the second pipe 33 extends in an upper part of a steam generator 50 (which will be described in detail later) and forms a steam ejector 34. The discharge end of the second pipe 33 is tapered, thereby becoming an inner nozzle of the steam ejector 34. An outer nozzle 35 of the steam ejector 34 extends from the side of the steam generator 50 to the downstream, and the discharge end of the outer nozzle 35 is tapered into a nozzle shape.

Figure 4:
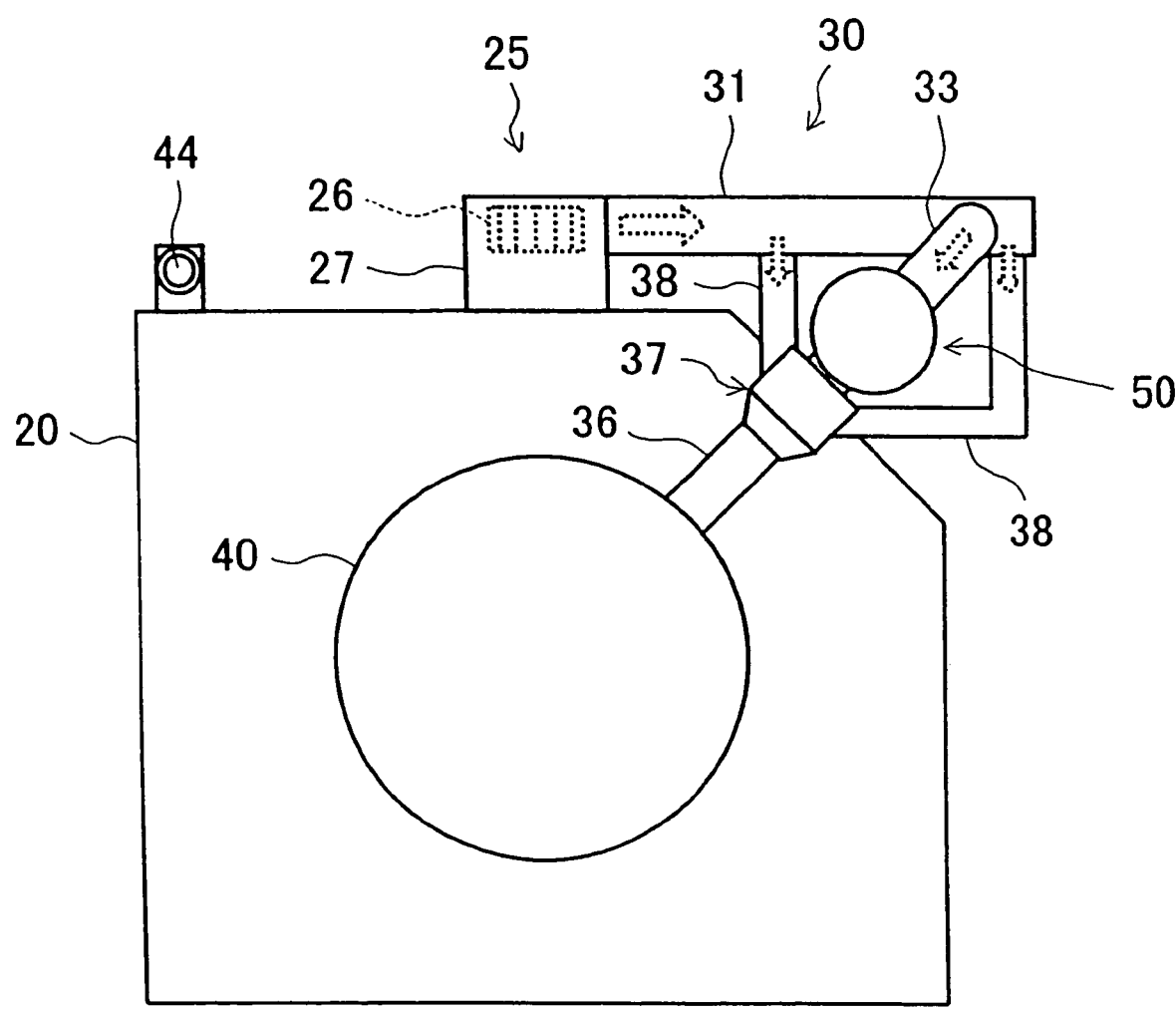
FIG. 4 is a top view of the cooking chamber.

The nozzle-shaped discharge end of the outer nozzle 35 is fit in a third pipe 36 of the external circulation path 30 on the downstream of the steam ejector 34. An end of the third pipe 36 is bulged so as to surround the outer nozzle 35, and a rear ejector 37 is formed in this portion. The nozzle-shaped discharge end of the outer nozzle 35 of the steam ejector 34 plays the role of an inner nozzle in the rear ejector 37. A bypass 38 branched from the first pipe 31 is connected to the rear ejector 37. The bypass 38 is also formed with pipes with circular cross section. As shown in FIG. 4, two bypasses 38 are provided and gas flows into the rear ejector 37 symmetrically in a horizontal plane.

The other end of the third pipe 36 is connected to a sub-cavity 40 serving as a gas return port 39 for returning gas into the cooking chamber 20. The sub-cavity 40 is provided above the ceiling of the cooking chamber 20 and in a portion corresponding to the center of the ceiling. The sub-cavity 40 has a circular shape in plan view, and a steam heater 41 as gas heating means is disposed in the sub-cavity 40. The steam heater 41 takes the form of a sheathed heater. The bottom of the sub-cavity 40 is formed with a metal panel (which also serves as the top plate of the cooking chamber 20) as a part of the ceiling wall of the cooking chamber 20. Plurality of perforations, which collectively forms a blowhole 43, are disposed on a bottom panel 42 of the sub-cavity 40 so as to spread two-dimensionally or three-dimensionally in the almost whole panel. The upper and lower faces of the bottom panel 42 are finished in dark color by a surface processing such as coating. The bottom panel 42 may be made of a metal that changes into dark color with use. Alternatively, the bottom panel 42 may be constructed with a ceramic component of dark color.

At an upper corner of the cooking chamber 20, a steam bleeding port 44 is formed. A motor-operated damper 45 is disposed at the end of the first pipe 31. The damper 45 selectively closes the exhaust port 32 and the inlet of the second pipe 33.

Figure 5:
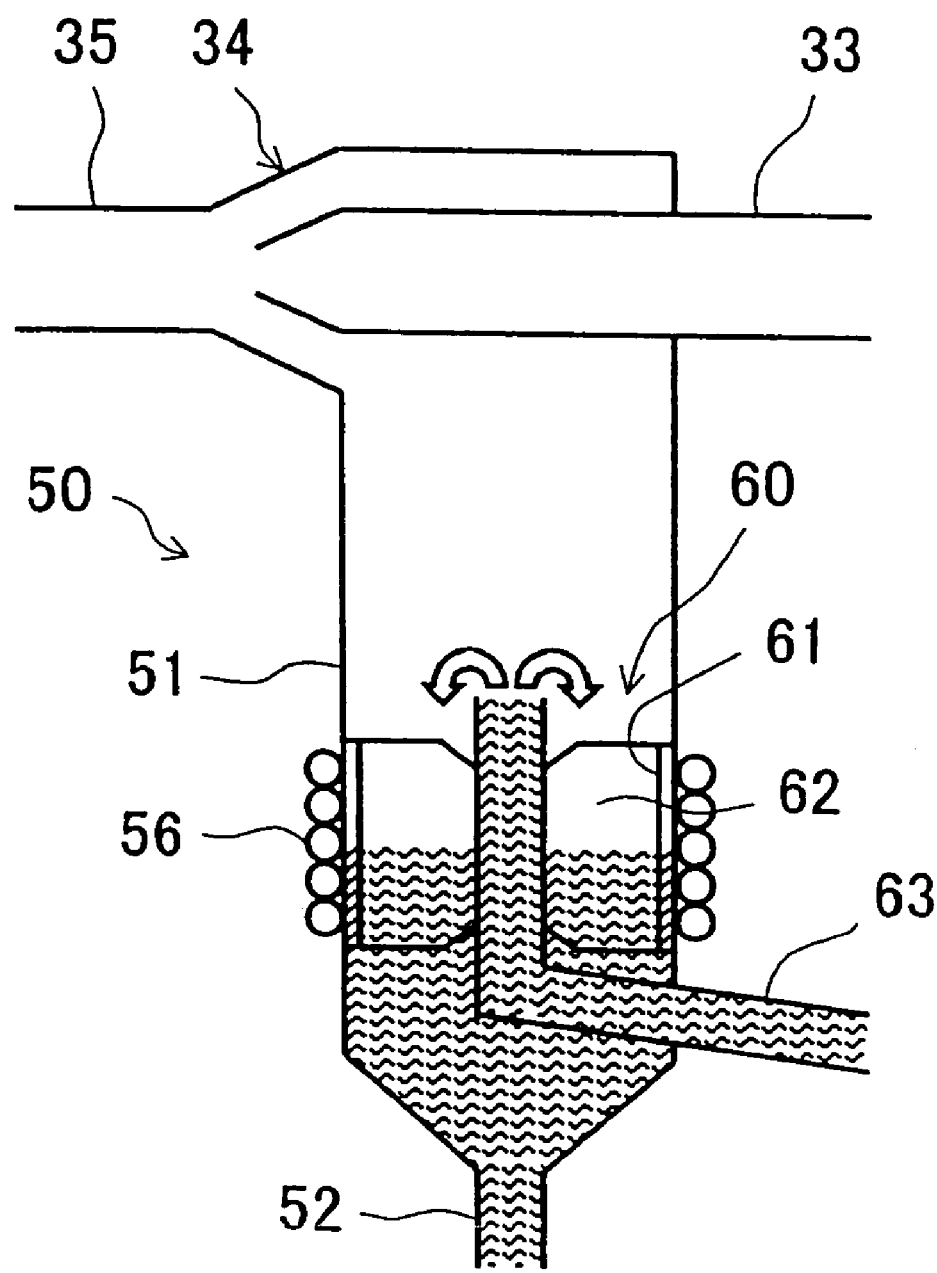
FIG. 5 is a vertical sectional view of a steam generator.
Figure 6:
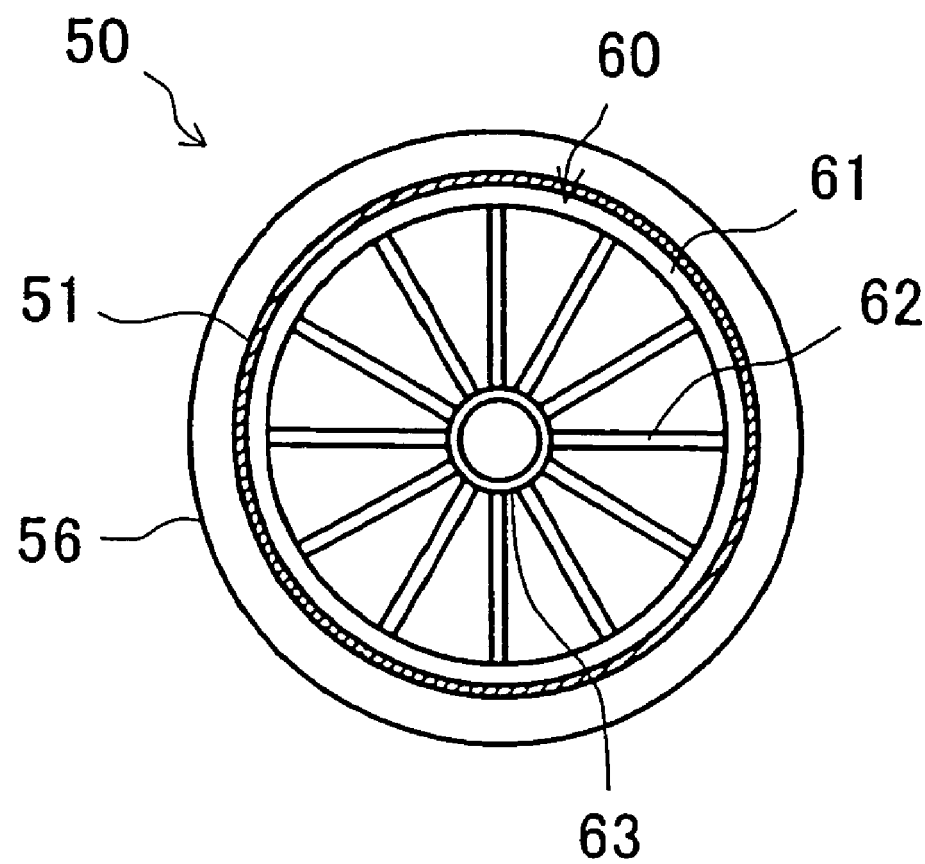
FIG. 6 is a horizontal sectional view of the steam generator.

The structure of the steam generator 50 will now be described with reference to FIGS. 5 and 6. The steam generator 50 has a cylindrical pot 51 with its center line disposed perpendicularly. The top portion of the pot 51 is closed and the steam ejector 34 is formed thereon as described above.

The bottom portion of the pot 51 is formed in a funnel shape, and a drain pipe 52 extends downward therefrom. The lower end of the drain pipe 52 is connected to a drain pipe 53 disposed so as to be slightly inclined from the horizontal line. An end of the drain pipe 53 extends through the side wall of the cooking chamber 20 to a position above the pan 21. A drain valve 54 and a water-level sensor 55 are provided on some midpoints of the drain pipe 52.

The water in the pot 51 is heated by a steam generation heater 56, which is closely attached to the outer surface of the pot 51. The steam generation heater 56 takes the form of an annular sheathed heater. A heat transfer unit 60 is disposed inside the pot 51 at a height almost the same as the steam generation heater 56.

The heat transfer unit 60 is constructed with a ring 61 closely attached to the inner surface of the side wall of the pot 51, and a plurality of fins 62 disposed radially in the ring 61. The ring 61 and the fins 62 are integrated by a method such as extrusion, welding or soldering. Each of the ring 61 and the fins 62 has a predetermined length in the axial direction of the pot 51.

Water is supplied into the pot 51 via a water supply pipe 63. The water supply pipe 63 enters the pot 51 from a portion near the bottom portion of the pot 51 and extends upward between the fins 62. The upper end of the water supply pipe 63 is slightly higher than that of each of the fins 62. As shown in FIG. 6, when the fins 62 are regarded as spokes of a wheel, the water supply pipe 63 is disposed at the position of a hub. An end face of each of the fins 62 is brought into contact with the external surface of the water supply pipe 63 to thereby transfer heat to the water supply pipe 63 via the fins 62.

The pot 51, the heat transfer unit 60 and the water supply pipe 63 are each made of a metal having high heat conductivity. Copper or aluminum is recommendable for their high heat conductivity. Copper or its alloy, however, is susceptible to patina. Consequently, although the heat conductivity is lower than that of copper or copper alloy, stainless steel, which is free from patina, can be an alternative.

A funnel-shaped inlet 64 is formed at an end of the water supply pipe 63. A flushing pipe 65 is connected in a position a little downstream of the inlet 64. The flushing pipe 65 is connected to the drain pipe 53 via a flushing valve 66.

To the water supply pipe 63, not only the flushing pipe 65 but also a water head pipe 67 having an inverted J shape are connected. The other end of the water head pipe 67 is connected to the drain pipe 53.

A water tank 71 having a thin rectangular parallelepiped shape is inserted into the water tank chamber 70. A water supply pipe 72 having an elbow shape, extended from the water tank 71, is connected to the inlet 64 of the water supply pipe 63. A pump 73 pumps water in the water tank 71 via the water supply pipe 72. The pump 73 is constructed with a pump casing 74 formed in the base portion of the water supply pipe 72, an impeller 75 housed in the pump casing 74, and a motor 76 for transmitting power to the impeller 75. The motor 76 is fixed to the side of the cabinet 10. When the water tank 71 is set in an appropriate position, the motor 76 is electromagnetically connected to the impeller 75.

A rail 77 having a trough shape, which supports the water tank 71, is fixed on the floor of the water tank chamber 70 (see FIG. 2). The tank supporting plane of the rail 77 is at the same level as the inner face of the door 12 opened horizontally. Consequently, the user puts the water tank 71 on the door 12 in the horizontal posture and pushes it along the rail 77, thereby enabling the water tank 71 to be smoothly set in a predetermined position in the water tank chamber 70. When the user opens the door 12 horizontally and pulls the water tank 71 out, the water tank 71 pulled out of the water tank chamber 70 is supported by the door 12. Therefore, the user does not have to support the water tank 71 with his/her hand for pulling it out.

Figure 7:
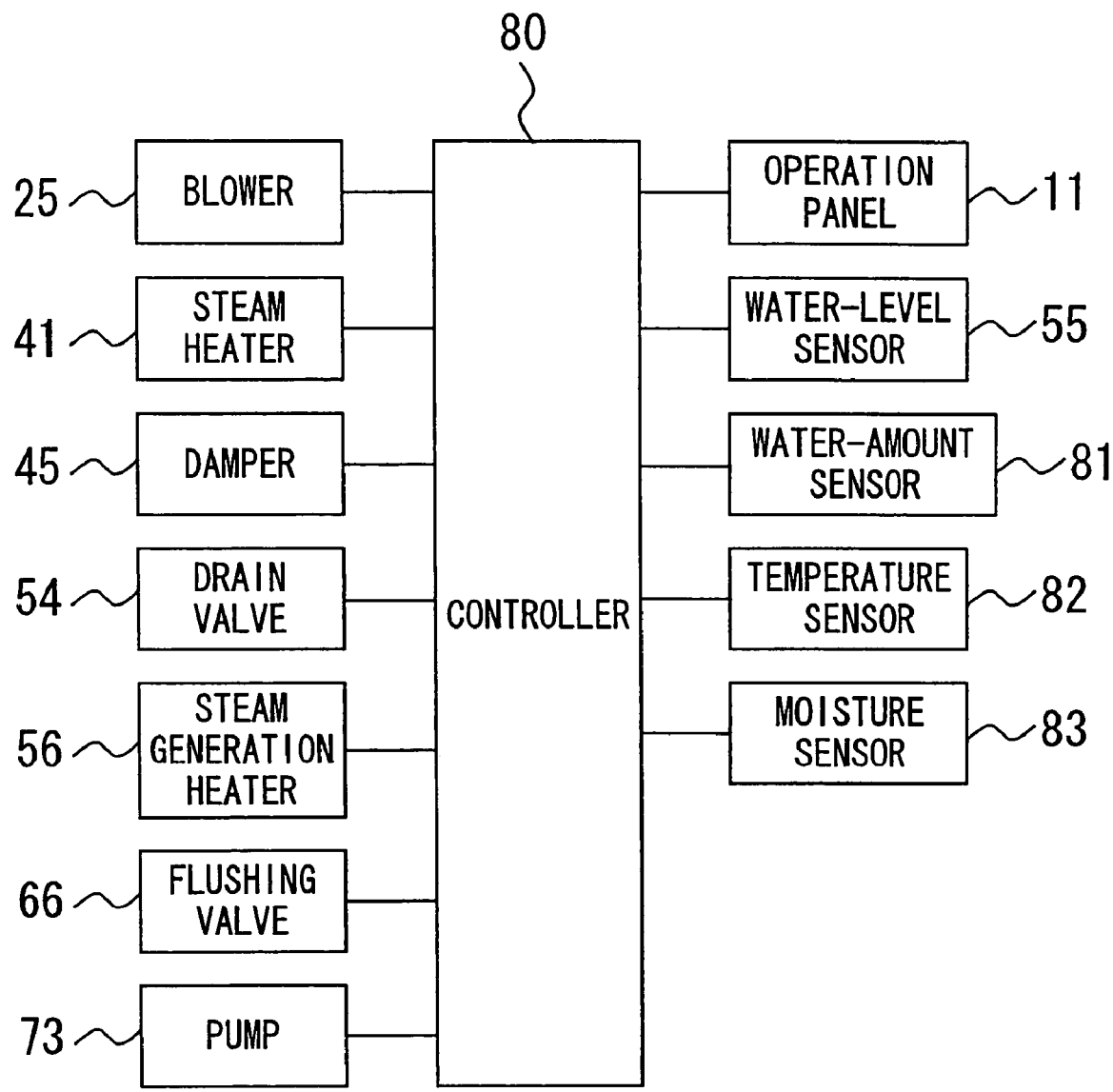
FIG. 7 is a control block diagram.

A controller 80 shown in FIG. 7 controls the operation of the steam cooker 1. The controller 80 includes a microprocessor and a memory and controls the steam cooker 1 in accordance with an installed program. A control state is displayed on a display device in the operation panel 11. An operation instruction is input to the controller 80 via various operation keys disposed on the operation panel 11. A sound generator for generating sound signals is also disposed on the operation panel 11.

To the controller 80, not only the operation panel 11, but also the blower 25, the steam heater 41, the damper 45, the drain valve 54, the water-level sensor 55, the steam generation heater 56, the flushing valve 65 and the pump 73 are connected. In addition, a water-amount sensor 81 for measuring the amount of water in the water tank 71, a temperature sensor 82 for measuring the temperature in the cooking chamber 20, and a moisture sensor 83 for measuring moisture in the cooking chamber 20 are connected to the controller 80.

The steam cooker 1 operates as follows. First, the user pulls the water tank 71 out of the water tank chamber 70, and supplies water into the tank via a water supply port (not shown). The user pushes the water tank 71 fully filled with water back into the water tank chamber 70 and sets it in the predetermined position. Confirming that the tip of the water supply pipe 72 is firmly connected to the inlet 64 of the water supply pipe 63, the user presses the power key on the operation panel 11 to turn the power on. The motor 76 of the pump 73 rotates and water supply to the steam generator 50 starts. At this time, the drain valve 54 and flushing valve 65 are closed.

Water spouts from the tip of the water supply pipe 63 like a fountain and drops to the bottom portion of the pot 51 while wetting the fins 62 of the heat transfer unit 60. The water accumulates from the bottom of the pot 51. When the water-level sensor 55 senses that the water level reaches the half of the length of the heat transfer unit 60, the water supply is temporarily stopped. The water level in the pipe on the inlet side of the water head pipe 67 reaches the same level as that in the pot 51.

After the above-mentioned amount of water is supplied into the pot 51, the steam generation heater 56 is energized. The steam generation heater 56 heats water in the pot 51 from outside the sidewall of the pot 51. When the side wall of the pot 51 is heated, the heat is conducted to the heat transfer unit 60 and transferred from the heat transfer unit 60 to the water. Since the height at which the steam generation heater 56 is disposed and the height at which the heat transfer unit 60 is disposed almost coincide with each other, heat is directly transferred from the steam generation heater 56 to the heat transfer unit 60 and efficiency of heat transfer is excellent.

The heat transfer unit 60 in which the plurality of fins 62 are disposed radially has a wide heat transfer area, so that water in the pot 51 is quickly heated. The fins 62 disposed radially support the pot 51 from the inside like the spokes of a wheel and the strength of the steam generator 50 is increased.

Concurrently with energization of the steam generation heater 56, energization of the blower 25 and the steam heater 41 is started. The blower 25 sucks gas in the cooking chamber 20 from the suction port 24 and blows the gas into the external circulation path 30. Since the centrifugal fan 26 is used to blow the gas, the flow velocity of gas current is higher as compared with a propeller fan. Moreover, the centrifugal fan 26 is rotated at high speed by the DC motor, the flow velocity of gas current is considerably high. Consequently, the pipes of the external circulation path 30 may have a circular cross section and, moreover, a small diameter. As compared with the case of forming the external circulation path 30 by a duct having a rectangular cross section, the surface area of the external circulation path 30 can be made smaller. Therefore, irrespective of the fact that hot gas passes the inside, heat dissipation from the external circulation path 30 is reduced, the proportion of the quantity of heat dissipated without being used for cooking is lowered, and the energy efficiency of the steam cooker 1 is improved. Also in the case where the external circulation path 30 is surrounded with a heat insulating material, a smaller amount of the heat insulating material is sufficient.

At this time, the damper 45 opens the inlet of the second pipe 33 of the external circulation path 30 and closes the exhaust port 32. Steam flows from the first pipe 31 to the second pipe 33, the third pipe 36, and then the sub-cavity 40 that serves as the gas return port 39. The steam is heated in the sub-cavity 40 by the steam heater 41 and, after that, is blown downward from the blowhole 43.

When the water in the pot 51 boils, saturated steam at a pressure of 1 atm at 100° C. is generated. The saturated steam is sucked into circulating gas current flowing in the external circulation path 30 at the steam ejector 34. Since an ejector structure is employed, the saturated steam is promptly sucked in. Because of the ejector structure, the circulating gas current does not apply pressure to the steam generator 50 and does not hinder discharge of the saturated steam.

In the rear ejector 37, gas is sucked from the bypass 38 by the gas current blown from the outer nozzle 35 of the steam ejector 34. By the existence of the bypass 38 which bypasses the steam ejector 34 to directly introduce gas flow, pressure loss of a circulation system is reduced and the centrifugal fan 26 can be driven efficiently. The gas containing saturated steam flows from the rear ejector 37, and then rushes into the sub-cavity 40 at high speed.

The gas containing saturated steam is heated to 300° C. by the steam heater 41 in the sub-cavity 40, and becomes superheated steam at this point. The steam expands as the temperature rises and blows with force from the blowhole 43.

A downward gas current formed in the center portion of the cooking chamber 20 (the place where foods are to be put) turns upward outside thereof at the bottom the cooking chamber 20 to form convection of gas. The gas is sucked into the suction port 24 again and returns from the external circulation path 30 to the sub-cavity 40. In such a manner, circulation of the gas in the cooking chamber 20, that goes out to the external circulation path 30 and returns to the cooking chamber 20, is repeated.

As time elapses, the proportion of steam in the gas increases. Excessive gas is discharged from the steam bleeding port 44 to the outside of the cooking chamber 20. If the gas containing steam is discharged directly into the cabinet 10, dew condensation develops inside the cabinet 10 to cause undesirable results such as rusting or electric leakage. If the gas is discharged directly to the outside of the cabinet 10, dew condensation spreads over a kitchen wall and the wall becomes susceptible to mold attack. To avoid this, the gas is introduced into a maze-like dew condensation path (not shown) provided in the cabinet 10 to condensate dew, and then discharged outside of the cabinet 10. Water resulted from the dew condensation is collected in the pan 21 together with the water resulted from other causes, and dumped after cooking.

When the gas containing superheated steam starts blowing, the temperature in the cooking chamber 20 rapidly rises. When the temperature sensor 82 senses that the temperature in the cooking chamber 20 reaches cooking range, the controller 80 displays the message on the operation panel 11 and beeps a sound. Being informed by sound or display that cooking is enabled, the user opens the door 12 and puts foods 90 into the cooking chamber 20.

When the user starts to open the door 12, the controller 80 changes the state of the damper 45 to close the inlet of the second pipe 33 and to open the exhaust port 32. The gas in the cooking chamber 20 is sucked by the blower 25 and, then, exhausted from the exhaust port 32. When the inlet of the second pipe 33 is closed, the superheated steam from the blowhole 43 is not blown, so that the user does not burn his/her face or hands with the superheated steam. The damper 45 maintains its state of opening the exhaust port 32 and closing the inlet of the second pipe 33 while the door 12 is open.

If gas exhaustion from the exhaust port 32 starts when the blower 25 is stopped, a time lag occurs until a stationary gas flow is obtained. In the case of the present invention, however, the blower 25 is already in operation, and no time lag takes place. Moreover, the current circulated in the cooking chamber 20 and the external circulation path 30 is directly turned into exhaust current from the exhaust port 32, there is also no time lag for changing the direction of current. Thus, the steam in the cooking chamber 20 can be exhausted without delay and the time required to enable the door 12 to be opened can be shortened.

At the time of exhausting steam from the cooking chamber 20, the second pipe 33 is closed and supply of steam to the cooking chamber 20 is stopped. Consequently, the pressure or quantity of the steam in the cooking chamber 20 decreases rapidly and the time required to enable the door 12 to be opened can further be shortened.

The signal that the user starts to open the door 12 can be transmitted to the controller 80, for example, as follows. A latch for maintaining the door 12 in a closed state is provided between the cabinet 10 and the door 12, and a latch lever for disengaging the latch is provided so as to be exposed from the handle 13. A switch which opens/closes in response to the motion of the latch or latch lever is disposed inside the door 12 or the handle 13. When the handle 13 and the latch lever are gripped together for unlocking, a signal is transmitted from the switch to the controller 80.

Like the gas bled from the steam bleeding port 44, the gas discharged from the exhaust port 32 also contains a large quantity of steam, and the gas discharged as it is may cause problems. Therefore, the gas exhausted from the exhaust port 32 is also passed through the maze-like dew condensation path provided in the cabinet 10 to remove moisture, and only the dried gas is discharged to the outside of the cabinet 10. Water resulted from the dew condensation is collected in the pan 21 together with the water resulted from other causes, and dumped after cooking.

When the user sets foods 90 on the rack 22 and closes the door 12, the damper 45 is reset to the state of opening the inlet to the second pipe 33 and closing the exhaust port 32. Consequently, blowing of the superheated steam from the blowhole 43 is restarted and cooking of foods 90 starts.

The superheated steam heated to about 300° C. and blown downward from the blowhole 43 strikes foods 90 and transfers heat to foods 90. Through this process, the steam temperature decreases to about 250° C. The superheated steam, which comes into contact with the surface of foods 90, discharges latent heat resulted from dewing on the surface of foods 90. Foods 90 are heated also by the latent heat.

Since foods 90 is heated while circulating the gas in the cooking chamber 20, the energy efficiency of the steam cooker 1 is high. The gas containing superheated steam is blown downward from the plurality of blowhole 43 disposed so as to spread two-dimensionally or three-dimensionally in the almost whole surface of the bottom panel 42 of the sub-cavity 40, so that the superheated steam strikes the whole top face of foods 90. Because the steam that strikes foods 90 is superheated and its striking area is wide, the heat of the superheated steam is quickly, efficiently transmitted to foods 90. Heating of the gas supplied into the sub-cavity 40 by the steam heater 41 makes the gas expand, and this expansion causes increased jet force and increased collision speed with foods 90. Thus, foods 90 are heated more quickly.

Since the centrifugal fan 26 can generate higher pressure as compared with a propeller fan, the force of jet from the blowhole 43 can be increased. As a result, the jet of superheated steam becomes longer and foods 90 can be heated intensely. And the centrifugal fan 26 is rotated at high speed by the DC motor and gas is blown strongly, the effect appears more conspicuously. The strong blowing power of the blower 25 can also be exploited to promptly exhaust the gas from the exhaust port 32 at the time of opening the door 12.

The superheated steam jet downward strikes foods 90 and, after that, changes its direction to the upward. Since the steam, particularly, superheated steam is lighter than air, the direction change occurs naturally and it causes convection current in the cooking chamber 20. By this convection current, while maintaining the temperature in the cooking chamber 20, the superheated steam just heated in the sub-cavity 40 can be continuously made strike foods 90, and a large quantity of heat can be promptly transmitted to foods 90.

The suction port 24 is positioned at a lower part of the side wall of the cooking chamber 20 (at or lower than the height of foods 90). The steam jet from the blowhole 43 travels straight without being deflected, strikes foods 90 and is sucked into the suction port 24. Consequently, the capability of heat transmission to foods 90 is maintained at a high level. Since the steam jet from above is sucked to the lower part of the side wall, when the door 12 is opened, the steam will not flow toward the user aggressively, making the safety level of the steam cooker 1 high.

As the suction port 24 faces downward, the lateral force acting on the steam jet becomes modest and the steam jet can be prevented from being deflected. Even if oil bubbles from the surface of foods 90, the oil is not so easily sucked into the suction port 24, that the inner surface of the blower 25 and the external circulation path 30 is prevented from oil accumulation.

The top face of the bottom panel 42 of the sub-cavity 40 wears dark color and absorbs radiation heat generated by the steam heater 41 well. The radiation heat absorbed by the bottom panel 42 is radiated from the bottom face of the bottom panel 42 of dark color into the cooking chamber 20. Consequently, temperature rise of the sub-cavity 40 and the outer surface of the sub-cavity 40 is suppressed and the safety of the steam cooker 1 is improved. On the other hand, the radiation heat of the steam heater 41 is transmitted to the cooking chamber 20 via the bottom panel 42 and the cooking chamber 20 is heated more efficiently. The shape in plan view of the bottom panel 42 may be circular or rectangular similar to that of the cooking chamber 20. The ceiling of the cooking chamber 20 may also serve as the bottom panel of the sub-cavity 40. That is, the ceiling of the cooking chamber 20 and the bottom panel of the sub-cavity 40 may be common to each other.

In the case where foods 90 are meat, as the temperature rises, oil may drip. Also, if the food 90 is liquid in a vessel, it may spill during boiling. Dripped or spilt liquid is received by the pan 21 and dumped after cooking.

In accordance with steam generation by the steam generator 50, the water level in the pot 51 lowers. When the water-level sensor 55 senses that the water level has lowered to a predetermined level, the controller 80 restarts operation of the pump 73. The pump 73 pushes up the water in the water tank 71 and supplies water as a compensation for evaporated water. When replenishment water passes through the water supply pipe 63, the heat of the steam generation heater 56 is transferred to the replenishment water via the fins 62 of the heat transfer unit 60. The replenishment water is thereby preheated and time required for the replenishment water to reach the boiling point is shortened.

The replenishment water overflowing from the upper end of the water supply pipe 63 is sprinkled on the upper part of the fins 62 out of water. The temperature of the part of the fins 62 exposed out of water is higher than that of the part in the water, so that the water sprinkled on the fins 62 instantaneously boils and evaporates, thereby increasing the steam pressure in the pot 51. Consequently, the steam blows forcefully from the outer nozzle 35, flows into the sub-cavity 40, and energizes jet of the superheated steam from the blowhole 43. Therefore, strong jet of the superheated steam is generated each time water is supplied.

At the time when the water-level sensor 55 senses that the water level in the pot 51 rises to the predetermined level, the controller 80 stops driving of the pump 73. In such a manner, the pump 73 intermittently performs water supply during cooking. The temperature of the part of the fins 62 exposed out of water temporarily drops each time water is sprinkled, and resumes its desired level soon after water sprinkling is stopped. Thereby, each time water is sprinkled, the water evaporates rapidly, and the jet power of the superheated steam is increased.

One embodiment of the present invention has been described above. The present invention can be further variously modified without departing from the gist of the present invention.

INDUSTRIAL APPLICABILITY

By carrying out the present invention, a steam cooker particularly suitable for home use can be obtained.

The invention claimed is:

1. A steam cooker, comprising:
   a cooking chamber in which foods are put;
   an external circulation path for blowing gas sucked from the cooking chamber via a suction port into the cooking chamber via a blowhole provided at a ceiling portion of the cooking chamber so that the gas strikes the foods in the cooking chamber;
   a blower for generating gas current traveling from the suction port to the blowhole in the external circulation path; and
   a steam generator for supplying steam to the gas passing through the external circulation path, wherein
   the external circulation path is provided with a steam ejector in a position downstream of the blower, the steam ejector having a suction portion for sucking steam generated by the steam generator, the suction portion being formed coaxially with the external circulation path.

2. The steam cooker according to claim 1, wherein the external circulation path is constructed using a pipe with circular cross section.

3. The steam cooker according to claim 1, wherein the blower includes a centrifugal fan.

4. The steam cooker according to claim 3, wherein a motor for driving the centrifugal fan is a direct current motor.

5. The steam cooker according to claim 2, wherein the blower includes a centrifugal fan.

6. The steam cooker according to claim 5, wherein a motor for driving the centrifugal fan is a direct current motor.

7. The steam cooker according to claim 1, further comprising:
   a gas current control plate provided inside the cooking chamber defines a suction port for drawing steam only at the bottom of the cooking chamber to the external circulation path.

8. The steam cooker according to claim 7, wherein the gas current control panel extends downward from a ceiling of the cooking chamber to a position near a floor surface of the cooking chamber.

9. A steam cooker, comprising:
   a cooking chamber in which foods are put;
   an external circulation path for blowing gas sucked from the cooking chamber via a suction port into the cooking chamber via a blowhole so that the gas strikes the foods in the cooking chamber;
   a blower for generating gas current traveling from the suction port to the blowhole in the external circulation path; and
   a steam generator for supplying steam to the gas passing through the external circulation path, wherein
   the external circulation path is provided with a steam ejector in a position downstream of the blower for sucking steam generated by the steam generator, wherein
   the external circulation path is provided with a bypass for the gas to bypass the steam ejector.

* * * * *